(No Model.)

W. D. F. JARVIS.
FISHING LINE REEL.

No. 368,922. Patented Aug. 23, 1887.

WITNESSES
Phil C. Dietrich.
A. E. Dowell

INVENTOR
Wm. D. F. Jarvis.
by:
T. H. Alexander
Attorney

UNITED STATES PATENT OFFICE.

WILLIAM D. F. JARVIS, OF PHILIPPI, WEST VIRGINIA.

FISHING-LINE REEL.

SPECIFICATION forming part of Letters Patent No. 368,922, dated August 23, 1887.

Application filed June 8, 1887. Serial No. 240,605. (No model.)

*To all whom it may concern:*

Be it known that I, WILLIAM D. F. JARVIS, of Philippi, in the county of Barbour and State of West Virginia, have invented certain new and useful Improvements in Line-Reels; and I do hereby declare that the following is a full, clear, and exact description thereof, reference being had to the accompanying drawings, and to the letters of reference marked thereon, which form part of this specification, in which—

Figure 1:
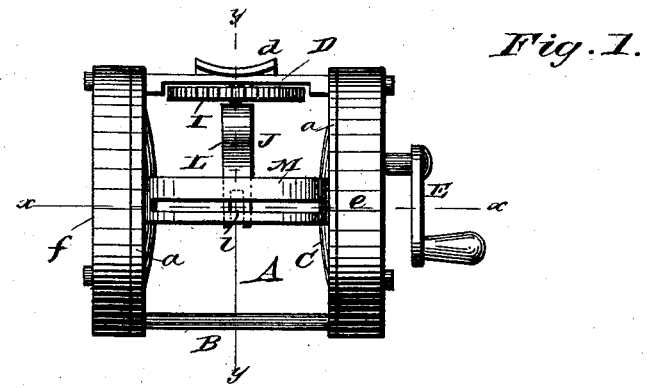
Figure 3:
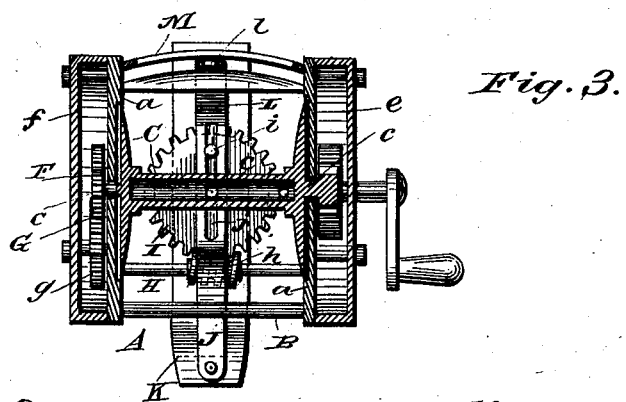
Figure 2:
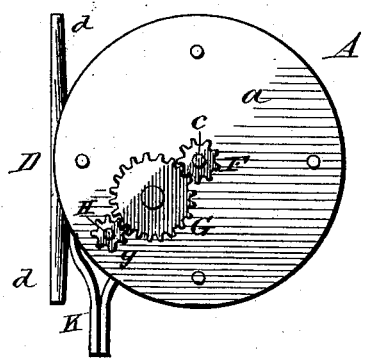
Figure 4:
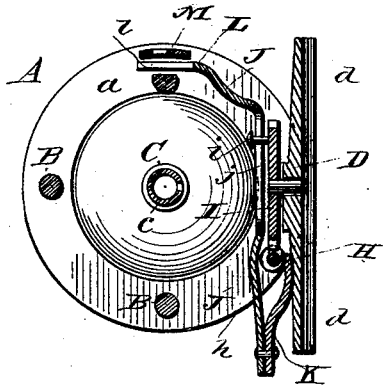

Figure 1 is a view of my improved reel for lines. Fig. 2 is an end view of the same with the cap removed, showing the gearing for actuating the worm-wheel shaft. Fig. 3 is a sectional view of the same on line $x\,x$, Fig. 1, showing the line-guide and its actuating mechanism. Fig. 4 is a cross-section on line $y\,y$, Fig. 1.

This invention relates to improvements in line-reels for fishing-rods, and it has for its object to provide a device for accurately and smoothly guiding and spooling the line as it is wound up; and to these ends the invention consists in the novel construction and arrangement of the parts of the device, hereinafter described, illustrated in the drawings, and particularly specified in the claims hereto appended.

Referring by letters to the drawings, A designates a reel-frame, of usual form and construction, composed of the end plates, $a\,a$, connected by rods B B, and having arranged concentrically within said rods the spool C, the shaft $c$ of which is journaled in proper bearings formed in the plates $a\,a$, as usual. At the rear side of the frame A its side pieces, $a\,a$, are connected to the rigid cross-bar D, which has a central transverse portion or piece, $d$, by which the reel is secured upon the rod in the usual manner.

The shaft $c$ is rotated by the usual crank, E, and suitable gearing situated at one end of the reel-frame. The means for rotating the spool forming no part of the present invention, further description thereof is deemed unnecessary. The actuating-gearing may be inclosed by a proper casing, $e$, as shown. At the opposite end of shaft $c$, outside its plate $a$, is secured on the extended end of said shaft a pinion, F, which meshes with a cog, G, journaled on a stud on the plate $a$, and which in turn meshes with a pinion, $g$, secured on the extended end of a shaft, H, which is properly journaled in plates $a\,a$, near to and below bar D and in front of piece $d$. This shaft H bears centrally a worm, $h$, that gears into and imparts motion to a pinion or gear, I, which is journaled to a stud on bar D, centrally of the length thereof, as shown. At a point near the periphery of said gear I, and standing from its inner face, is a wrist-pin, $i$, which engages in a slot, $j$, in a pivoted lever or guide-bar, J. This bar J is pivoted at its lower end to the lower end of the piece $d$, (or to a piece or lug, K, secured to and standing outward from the piece $d$, as shown,) in line with the journal of gear I, and extends upward across and outside of the gear I, the slot $j$ being formed in bar J, where it crosses gear I, so that when the latter is rotated the bar will be oscillated or reciprocated laterally, as is obvious, through its engagement with pin $i$. The upper end of bar J is bent horizontally forward, forming an arm, L, as shown, and this arm L forms the line-guide proper, and its front end stands in line with and above the shaft $c$ of spool C, and is slotted at $l$, as shown. The slotted end of guide L plays below a longitudinally-slotted plate, M, secured between plates $a\,a$, as shown, the slot in said plate coinciding with the slot in guide L, so that a line passed through said slots will be prevented from escaping from either slot laterally, and as bar J and its arm are reciprocated the line will be directed from one end of spool C to the other successively, so that when the line is being taken in it will be wound evenly and smoothly upon spool C, as is evident.

The rotation of shaft $c$ necessarily imparts motion, through spurs and gears F, G, and $g$, to shaft H, and the latter shaft imparts motion to gear I through worm H, and the latter to bar J, as is obvious.

The actuating-gears for shaft H are preferably protected by a casing, $f$, similar to casing $e$, and the worm $h$, gear I, and lower portion of bar J may be also protected by a suitable casing, a proper opening being left in its upper end to allow free play of the bar J.

It will be observed that by forming the guide-line eye or guide proper by means of the oppositely-extending slots in the movable arm L and plate M, I greatly lessen the liability to strain or breakage of the guide-arm, for should the cord become knotted or tangled in reeling it will be stopped by engaging the slot in the fixed plate M, and should it knot in unwinding, while it would catch on arm L, yet the latter would immediately bind against the lower face of plate M and be kept from bending. The two slots being independent of each other will also admit of the ready passage of unequally spun or twisted line, which would be liable to bind where the guide-eye is made in a single piece of metal. The plate M also relieves arm L from any longitudinal pressure, as is evident. By properly varying the pitch of the threads of worm $h$ the reel can be adapted for lines of different sizes.

The arrangement of devices or plates $a\,a$ for driving shafts $c$ and H may be transposed, so as to adapt the reel for use either on top or under the pole, as may be desired.

Having described my invention, I claim—

1. In a reel, the combination, with the reel-frame and spool and its shaft and actuating devices, of a worm-shaft journaled in the frame to one side of the spool-shaft and actuated therefrom, a gear-wheel engaging said worm-shaft and provided with a wrist-pin, and a slotted bar pivoted at one end to the reel-frame support and reciprocated by the wrist-pin on said gear-wheel and having a slotted line-guide arm at its upper end playing under a fixed transversely-slotted plate, all constructed and arranged to operate substantially as described.

2. In a reel, the combination, with the main frame, its spool and spool-shaft, and the worm-shaft actuated by suitable gearing from the spool-shaft engaging a gear, I, of the bar J, pivoted to the main frame below said gear, having a slot engaged by a wrist-pin on said gear-wheel, so as to be reciprocated thereby, and the guide-arm L at the upper end of bar J, provided with slot $l$, and adapted to reciprocate below a slotted plate, M, all substantially in the manner and for the purpose specified.

3. The combination, in a fishing-reel, of frame A, having spool C, worm-shaft H, and their operating mechanisms, substantially as described, and the supporting-bar D and piece $d$, with the gear I, bar J, having slotted line-guide arm L, and the slotted line-guide plate M, operating with said arm, all constructed and arranged to operate substantially as set forth.

In testimony that I claim the foregoing as my own I affix my signature in presence of two witnesses.

WILLIAM D. F. JARVIS.

Witnesses:
D. J. TAFT,
W. P. SCOTT.